United States Patent
Memmer

[11] 3,931,870
[45] Jan. 13, 1976

[54] ENGINE OVERSPEED CONTROL OF RETARDER

[75] Inventor: James A. Memmer, Indianapolis, Ind.

[73] Assignee: General Motors Corporation, Detroit, Mich.

[22] Filed: June 12, 1974

[21] Appl. No.: 478,455

[52] U.S. Cl............... 188/296; 188/181 R; 192/4 B; 303/21 CF
[51] Int. Cl.² ........................................ F16D 57/02
[58] Field of Search ........... 188/290, 292, 296, 180, 188/181 R; 303/10, 21 CF; 192/4 B

[56] References Cited
UNITED STATES PATENTS

| | | | |
|---|---|---|---|
| 2,946,416 | 7/1960 | Snoy .................................. | 188/290 |
| 3,423,136 | 1/1969 | Lohbauer........................... | 303/10 |
| 3,524,523 | 8/1970 | Klimex et al...................... | 188/296 |
| 3,547,231 | 12/1970 | Braun ................................ | 188/296 |
| 3,565,492 | 2/1971 | Allen et al. ..................... | 303/21 CF |
| 3,814,221 | 6/1974 | Fuehrer............................. | 192/4 B |

FOREIGN PATENTS OR APPLICATIONS
977,493    8/1966    Germany ............................ 188/296

Primary Examiner—Trygve M. Blix
Assistant Examiner—Edward R. Kazenske
Attorney, Agent, or Firm—A. M. Heiter

[57] ABSTRACT

A power train having an engine, a retarder and a transmission and controls to manually control the retarder and an engine overspeed responsive control operative to shorten a link in the manual control to move the retarder control valve to automatically apply the retarder in response to engine overspeed. An air cylinder in a link of the retarder apply linkage is actuated by vehicle air brake pressure controlled by a transmission input or engine speed governor to apply the retarder and prevent engine speed above a predetermined value and thus limit vehicle speed. When the retarder apply air cylinder shortens the link, the retarder apply pedal engages the brake off stop to provide the reaction to move the retarder valve.

6 Claims, 1 Drawing Figure

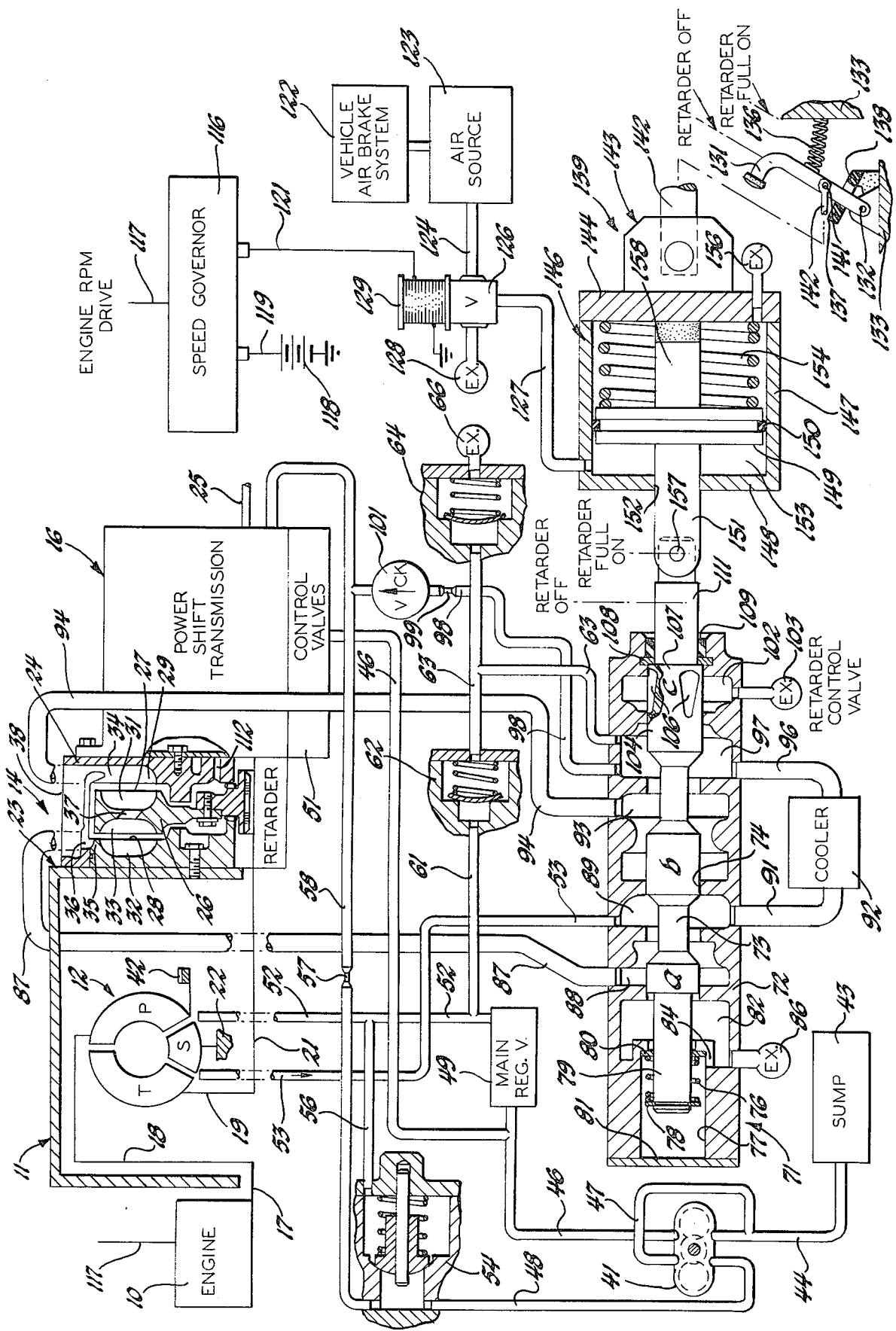

ENGINE OVERSPEED CONTROL OF RETARDER

RELATED APPLICATIONS

The retarder and a manual retarder control is shown in the Fuehrer et al application Ser. No. 345,725, filed Mar. 28, 1973.

BRIEF DESCRIPTION OF INVENTION

This invention relates to power trains and particularly to retarders and controls therefor.

The power train has an engine, a transmission and a retarder. The engine has a maximum rated speed and preferably is governed at this rated speed. The engine or transmission input is connected to a speed governor to provide an engine overspeed signal when, due to downhill coasting of the vehicle, the engine speed is a predetermined speed above the maximum rated driving speed. The predetermined engine overspeed is selected, considering the braking capacity provided by the engine retarder and vehicle brakes, to begin automatic retarding at a proper overspeed for normal downhill overspeed control to prevent excessive speed braking operation. The speed governor has hysteresis to continue the overspeed signal and automatic retarding until the engine speed decreases to a small underspeed, a speed just below the maximum rated speed, to prevent hunting.

The hydrodynamic retarder has a bladed stator chamber formed in a stationary housing and a bladed rotor mounted for rotation with a shaft of the drive train. The control connects the fluid pressure supply through the cooler. The manual retarder control valve in the retarder on positions connects the cooler outlet to the inlet to the retarder chamber and has a varible exhaust to control the pressure and flow of fluid supplied to the retarder chamber to control the amount of brake torque. The retarder pumps the fluid through the retarder chamber to the retarder outlet which is connected by the control valve to the cooler inlet. In the retarder off position, the retarder control valve blocks flow to the retarder inlet and connects the retarder outlet to exhaust to empty the retarder chamber.

The manual retarder control valve is controlled by a control mechanism, including a manual actuator having a manual control member, such as a foot pedal, movable between a retarder off and a retarder on position. The pedal is connected by a linkage and automatic control to the retarder valve element to normally selectively move the valve element between the retarder off position and retarder on position. The manual retarding control functions normally to control the retarder as long as the engine and transmission input speed remains in the normal operating range or does not exceed the predetermined overspeed. When the engine is driven by the load, such as occurs during downhill vehicle operation, to cause the engine speed to increase to a predetermined overspeed value, the speed governor provides a governor overspeed signal until the speed is reduced to a small underspeed. The electric governor overspeed signal actuates a solenoid relay control valve to provide an air pressure overspeed signal from the vehicle brake air pressure source. The linkage mechanism has a motor operable in response to a pressure signal to change the relative position of a pair of linkage members to move the retarder valve element from the retarder off position to the retarder on position while the manual control member remains in the retarder off position. The motor, preferably an air cylinder, has a piston attached to one rod portion connected to the valve element, a cylinder attached to another rod portion connected to the pedal and biasing means, a spring, holding the piston relative to the cylinder in a retarder manual on off selecting position so that movement of the manual control member between retarder off and on positions provides like positions of the valve element. With regard to automatic speed controlled operation, this is the automatic retarder off position in which the springs in the air cylinder hold the linkage in the elongated position. An engine overspeed, the overspeed signal pressure acts in a motor chamber in the air cylinder to move the piston against the spring to an automatic retarder on position to shorten the linkage to position the valve element in the retarder on position while the manual control member or pedal remains in the retarder off position against a retarder off stop to provide the reaction for retarder valve movement.

The retarder valve has retarder on and off position stops limiting valve element movement in the on and off positions and secondarily limiting air cylinder and pedal movement. The pedal on and off position stops permit pedal movement to provide full valve movement notwithstanding tolerance variation of the linkage. The air cylinder on and off stops provide full valve movement notwithstanding their and the pedal off stop tolerance variation. The pedal return spring provides a sufficiently large intermediate force to insure return movement of the linkage to permit or assist return valve movement by the small force valve return spring and a normal resistance to manual retarder apply movement. The air cylinder return and valve return force transmitting spring provides a larger force to insure that it will transmit the pedal return spring force without compression to insure valve movement to the off position during manual brake release and also provides the automatic brake release force, which will be limited by the pedal return spring force to return the valve to off position. The pedal manual apply force is transmitted positively by the air cylinder piston engaging the cylinder, the automatic off position stop, to transmit full manual apply force required to move the valve against the valve return spring. The air pressure overspeed signal acting on the piston provides sufficient force to positively overcome the air cylinder return spring and automatically move the valve against its return spring as the pedal abuts its off stop to provide the reaction for the air force. The air apply force provides a reaction force at the pedal sufficiently larger than the required normal retarder apply force to inform the operator that the retarder has been automatically applied which the operator may overcome, moving the pedal causing movement of the air cylinder to the automatic off position but holding the valve in the retarder on position to provide continuous retarder operation as the speed decreases below the small underspeed.

These and other features will be apparent from the following description of a preferred embodiment and the drawing.

The drawing schematically shows a power train including a retarder and manual and engine speed responsive retarder controls for the retarder.

DETAILED DESCRIPTION

Referring to the drawings, the drive train has an engine 10 and a transmission 11 including a torque converter 12 or other fluid drive, a retarder 14 and power shift transmission gear unit 16 arranged in series. The conventional engine 10 has an output shaft 17 driving the torque converter input member 18, a rotary housing. The conventional torque converter has a pump P mounted on the rotary housing, a turbine T connected by hub 19 to drive the intermediate and retarder shaft 21 and a stator S fixed or connected by a one-way device, not shown, to the stationary converter housing portion 22 of the transmission housing 23. When the engine drives the rotary housing and pump P, fluid is circulated through the turbine T and stator S to provide a torque multiplication drive to the intermediate shaft 21. The retarder 14 has a retarder stator housing 24, a portion of transmission housing 23, enclosing a rotor 26 mounted for rotation with and on shaft 21 which is conventionally mounted in suitable rotary bearings not shown in the torque converter and power shift transmission 16 and may also have bearings in the retarder housing. The intermediate or retarder shaft 21 drives the conventional multiratio power shift transmission having controls 51 including a plurality of fluid operated drive engaging devices and shift valves to provide a plurality of ratio drives to the output or load member or shaft 25.

The retarder 14 is of the dual chamber type having a first or inlet toroidal chamber 27 and a second or downstream outlet toroidal chamber 28. The first chamber has a bladed stator cavity 29 formed by a stator shell in the rear wall of retarder housing 24 with radial blades therein and a bladed rotor cavity 31 formed by a rotor shell in the adjacent side of the rotor 26 with radial blades therein. The second chamber has a bladed stator cavity 32 formed by a stator shell in the front wall of housing 24 with radial blades and a bladed rotor cavity 33 formed by a rotor shell with radial blades in the adjacent side of the rotor 26. Each toroidal chamber is formed by a stator shell and a rotor shell having, in a radial cross section in a plane containing the retarder axis, the straight radial portion of the blades facing and adjacent each other at a central transverse plane and the curved portions extending oppositely away from the central plane to provide a toroidal flow chamber having a circular cross section such as the radially elongated circular cross section shown in the drawing or other similar cross sections employed in hydrodynamic machines including a true circle and eliptical variations. In such toroidal flow chambers the rotation of the rotor pumps the fluid circumferentially and radially outwardly in the rotor chamber portion, axially and helically from the radially outer portion of the rotor chamber portion to the stator chamber portion and then radially inwardly in the stator chamber portion and then axially without a helical component at the radially inner part of the chamber to the rotor chamber portion, a toroidal flow path. The rotor and stator cavities form the chambers, extend annularly about the retarder axis and have the radially extending blades dividing the cavities into an annular series of a plurality of pockets.

The stator cavity 29 of inlet chamber 27 is modified to provide retarder inlet passage 34. The stator cavities 29 and 32 respectively of the inlet chamber 27 and downstream chamber 28 are both modified to provide an outlet passage as shown by the retarder outlet passage 36 in stator cavity 32. The rotor 26 has a transfer passage provided by a plurality of transfer passages 37 extending from the inner portion of inlet rotor cavity 31 radially outward and axially to the rotor cavity 33 to transfer fluid from the inlet chamber to the downstream chamber. The inlet passage 34, outlet passage 36 and transfer passage portions 37 are constructed to provide pumping action varying as a function of toroidal flow and thus retarding power.

The hydraulic control system is supplied with fluid by a three gear fluid supply pump 41, conventionally driven by the input driven gear 42 on the torque converter rotary housing 18 driving pump P. This fluid supply pump has one pump unit supplying fluid from the sump 43 and suction line 44 to the main line 46 and another pump unit supplying fluid from suction line branch 47 to the lubrication line 48. The main line 46 is connected to the main regulator valve 49, a conventional regulator valve, regulating main line pressure at a high value, i.e. 165 psi, to supply main line pressure to the transmission control valves 51. The main regulator valve 49 delivers overage fluid from the main line to the torque converter inlet line 52 to supply fluid to the torque converter 12. The fluid fills the operating chamber of the torque converter and flows out of the torque converter operating chamber through torque converter outlet line 53. The lubrication supply line 48 is connected to the lubrication supply regulator valve 54 which regulates lubrication supply pressure at an intermediate pressure, i.e. 70 to 125 psi, and has a lubrication supply overage line 56 connected to the main regulator valve overage or converter inlet line 52. The lubrication supply regulator valve 54 provides a low pressure differential, i.e. 20 psi, between the higher pressure in the lubrication supply line 48 and the lower pressure in the main regulator valve overage or converter inlet line 52. The lubrication supply line 48 is connected through a restriction 57 to the lubrication feed line 58 which connects lubrication fluid to the lubrication system within the power shift transmission 16 having a lower pressure, i.e., 20 to 40 psi. The main regulator valve overage line 52 is also connected by a branch line 61 to the primary converter pressure regulator valve 62 and the overage is connected to the relief line 63 and provides a moderate pressure differential, i.e. 50 psi. The primary converter pressure regulator valve 62 is normally closed but limits converter inlet pressure to prevent abnormally high pressure due to high downstream restriction which may be caused by cold oil or fluid in the converter and cooler. The pressure relief line 63 is connected to the secondary converter regulator valve 64 which limits the pressure to a low value, i.e. 55 psi, and connects the overage through exhaust 66 to the sump.

The retarder control valve 71 has a valve body 72 actually secured and sealed to the face 38 of retarder housing 24 but shown diagrammatically for clarity. The retarder valve 71 has a valve element 73 having equal diameter lands a, b and c reciprocally mounted in a bore 74 in the valve body and is shown in the retarder full on position. The valve element 73 is positioned in the retarder full on position shown by manual and automatic control means described below and biased by a spring 76 located in the enlarged spring chamber portion 77 of the bore and abuts a snap ring abutment 78 fixed on the end of stem 79 of the valve element and an abutment 80, a washer on a shoulder portion of the valve body at the inboard end of the spring chamber. The outboard end of the spring chamber is sealed by a plate 81 suitably secured to the valve body. The stem and plate provide movement limiting means stopping and limiting movement of the valve element in the retarder off position. The valve body has the following ports described in their order from the spring chamber end. Adjacent the spring chamber an exhaust port 82 is connected by port 84 to the spring chamber and both are connected to exhaust to sump by dump exhaust 86. The retarder outlet line 87 from outlet passage 36 is connected to the retarder outlet port 88 in the valve body which, in the retarder on position shown, is connected between lands *a* and *b* of valve element 73 to the torque converter outlet port 89. The torque converter outlet line 53 and cooler inlet line 91 for cooler 92 are connected to port 89. Next adjacent in the valve body is the retarder inlet port 93 which is connected to the retarder inlet line 94 and inlet passage 34. The cooler outlet line 96, pressure relief line 63 and supplemental lubrication line 98 are connected to the cooler outlet port 97. The exhaust port 102 is connected to exhaust 103.

With valve element 73 in the retarder on position shown, converter outlet line 53 and retarder outlet line 87 are connected between lands *a* and *b* through ports 88 and 89 in parallel to the cooler inlet line 91 and cooler 92. The cooler outlet line 96 is connected between the lands *b* and *c* to the cooler outlet port 97, the retarder in port 93 and line 94. The cooler outlet port 97 is also connected in parallel to relief line 63, so the secondary converter regulator valve 64 limits retarder inlet pressure to the low pressure and exhausts overage to sump. The cooler outlet line is also connected by a supplemental lubrication line 98 which has a restriction 99 therein to limit supplemental lubrication flow from the low pressure source and one-way check valve 101 permitting flow only from the cooler outlet port 97 to the lubrication feed line 58 and preventing return flow of lubricating oil from the lubrication feed line to the retarder system. In the retarder full on position the land *c* of valve element 73 has a complete full diameter portion 104 in the bore between cooler outlet port 97 and exhaust port 102 to prevent any flow to exhaust. The tapered exhaust recesses 106, or variably restricted exhaust passages, are within the exhaust port 102 and nonfunctional. The land *c* has a complete full diameter portion at both ends of recesses 106, one 104 effective in retarder on as pointed out above, and one 107 effective in retarder off as pointed out below. A snap ring stop 108 in bore 74 engages land *c* as shown to limit valve element movement in the retarder on position. A seal 109 in the end of bore 74 sealingly engages handle stem 111 of the valve element 73 to prevent leakage. The retarder valve 71 in the retarder on position connects the retarder 14 and cooler 92 in series, the cooler outlet 96 in parallel to the retarder inlet 94, the supplemental lubrication feed 98 and the low pressure regulator valve line 63 and valve 64 which limit cooler outlet, retarder inlet and supplemental lubrication feed pressures to a low value, i.e. 55 psi. The overage supply in the converter inlet line 52 is connected in series through the converter 11 and joins retarder outlet line 87 so both flow through the cooler 92. Since retarder full on is a steady state condition in which the amount of fluid in the retarder chambers is not materially changed, the amount of flow from overage line 52, added to the retarder cooler series or loop circuit upstream of the cooler is exhausted to sump downstream of the cooler by low pressure relief valve 64.

If the operator relaxes the manual force or the automatic speed responsive control discontinues the force holding valve element 73 in the retarder full on position shown, the spring 76 will move the valve element to the normal retarder off position indicated by the dot-dash line. In the retarder off position the land *a* moves out of the bore between retarder outlet port 88 and exhaust port 82 providing a full flow connection from the retarder outlet line 87 and port 88 between lands *a* and *b* to the dump exhaust port 82 and exhaust 86. This is a low restriction or unrestricted flow path for fast damping of the retarder chambers. In the retarder off position the land *b* engages the bore at both sides of torque converter outlet port 89 so that torque converter outlet flow line 53 is connected only to cooler inlet line 91 and is disconnected from retarder outlet flow in the retarder outlet port 88.

In both the retarder off and the retarder on positions land *b* of valve element 73 is in the bore between converter outlet port 89 and retarder inlet port 93 so there is never any flow from the converter outlet or retarder outlet directly to retarder inlet but only through the cooler to retarder inlet or sump. Also the full diameter portion 104 of land *c* enters the bore between cooler outlet port 97 and retarder inlet port 93 to prevent any supply flow from the cooler via the cooler outlet line 96 and port 97 to the retarder inlet line 94. In the retarder off position the land *c* is positioned so that the full diameter portion 107 of land *c* is in bore 74 between cooler outlet port 97 and control exhaust port 102 to prevent flow to exhaust 103 so the recesses 106 are nonfunctional. Thus the overage supply to the converter inlet line 52 is connected in series by the retarder valve 71 through the converter 12 and cooler 92 and then in parallel to the supplemental lubrication line 98 to supply supplemental lubrication and to the pressure relief line 63 and low pressure relief valve 64 to limit cooler out pressure at the low pressure, i.e., 55 psi, and return the remaining flow to sump. An atmospheric vent 112 is provided in the retarder housing portion near the axis where there is no fluid due to the centrifugal action during the retarder operation and is connected to atmosphere in the upper portion of the transmission housing so the retarder pumping action quickly dumps fluid from the retarder chambers in the retarder off position of the retarder valve.

On initial movement of the retarder valve element 73 from the retarder off position to a minimum retarding position, land *a* closes the connection from retarder outlet port 88 to exhaust port 82 and land *b* opens a connection from the retarder outlet port 88 to the converter outlet port 89 so outlet flow joins any retarder outlet flow in converter outlet and cooler inlet port 89 for flow through the cooler inlet line 91, cooler 92 and cooler outlet line 96 to the cooler outlet port 97. The cooler outlet port 97 is connected between lands *b* and *c* to the retarder inlet port 93 and line 94. During initial movement retarder inlet pressure has a minimum low value, zero or almost zero, i.e. 2 psi, since the recesses 106 provide the largest opening or least restriction of flow to control exhaust 103 and the retarder pumping action circulates flow through the retarder cooler series circuit. There is no supplemental lubrication flow as the lubrication pressure is higher and closes check valve 101. Regulator valve 64 remains closed until retarder inlet pressure rises to the maximum low pressure value for full retarding, i.e., 55 psi. On initial movement from the retarder off position to the minimum retarding position the above change of connections are substantially simultaneous, but preferably the retarder outlet port 88 is blocked from exhaust 86 and connected to converter outlet port 89 and the recesses 106 positioned to provide the largest opening to exhaust 103 before the connection from cooler outlet port 97 to retarder inlet port 93 is open to insure proper initial minimum retarding.

As the valve element 73 is gradually moved from the minimum retardiing position to retarder full on position, the tapered recesses 106 gradually close the restriction between the cooler outlet port 97 and exhaust port 102 so that more fluid at a higher pressure flows to the retarder to increase retarder fill pressure and power capacity. The restriction closes and increases retarder inlet pressure as an exponential function increasing with valve movement, relative to the directly exponential increase of power capacity with speed, so retarder power capacity varies as a straighter line function of valve movement. At the outlet passage 36, the stator cavity 32 has a circular dividing edge portion 35 extending for the short peripheral length of the outlet passage, about one tenth or one twelfth of the perimeter, and has a smaller radius than the normal outer radius of the cavity shell. The dividing edge is substantially at the central plane. The axial toroidal flow from the rotor cavity 33 to the stator impinges on this edge which divides the toroidal flow so that a portion continues in the curved toroidal flow path in the reduced outer radius cavity portion or pockets and a portion is turned in the similarly curved faired outlet port 36 to provide retarding and enter the outlet line 87 converting toroidal flow velocity head to outlet flow pressure head without loss of brake capacity.

This structural arrangement provides outlet flow or pumping action essentially varying as a function of the velocity head of the toroidal flow in the chambers and the centrifugal pressure head of the fluid in the chambers is restrained from causing pumping. Thus outlet flow is substantially proportional to the power being absorbed by the retarder.

The retarder inlet passage 34 of stator cavity 29 extends circumferentially one tenth or twelfth of the circumference and has the same inner and outer radius as the other pockets. The inlet passage 34 has a planar or flat radial transverse outer wall tangent to cavity 29 at its axially widest portion in the radially central region. The central radial transverse wall of the inlet passage 34 is intermediate the outer wall and the opposite edge of the cavity at the center of the chamber and curves and terminates in a radial portion entering the cavity 29 at a point within the outermost diameter so the mean inlet flow vector merges with the outer toroidal flow vector. The inlet flow thus enters the inlet passage 34 of the stator cavity 29 of the toroidal chamber 27 at a point within the outermost diameter of the shell so that the centrifugal pressure head is at an intermediate value and the toroidal flow in the chamber has changed from axial flow to have a substantial radially inward flow component to merge with the inlet flow. This inlet structure directs the outer high velocity toroidal flow along the central axis of the inlet flow in the inlet stator cavity to add the velocity pressure head of the toroidal flow to the inlet pressure head for efficient injection pumping action of the fluid into the retarder.

GOVERNOR OVERSPEED SIGNAL SYSTEM

The engine or transmission speed governor 116 is driven by a suitable engine speed governor drive 117 often provided on engines or a drive driven by accessory drive gear 42 on the torque converter rotary housing 18 and provides an engine overspeed signal when engine speed exceeds the rated or governed maximum engine drive speed. Such overspeeds occur when the load or vehicle overruns or drives the engine and it is desirable to limit the amount of such overspeed to values that properly provide increased engine braking. On providing an overspeed signal, the governor has hysteresis so a reduction of engine speed to a speed sufficiently, a small amount, below the maximum rated or governed speed to prevent hunting discontinues the signal. A conventional electric speed governor 116 is shown. A grounded electric power source 118 is connected by conductor 119 to the governor 116 which provides the overspeed electric signal in signal conductor 121.

The system includes an air brake system 122 having a source of air pressure 123 conventionally including an air pump driven by gear 42 or other accessory drive and a pressure tank. The air source is connected by air supply line 124 to a solenoid valve 126. The solenoid valve 126 in the normal de-energized position blocks supply line 124 and connects actuator line 127 to exhaust 128. When the governor 116 provides an overspeed signal in conductor 121 connected to solenoid 129, the solenoid valve 126 connects air supply line 124 to actuator line 127 providing an overspeed pressure signal and blocks exhaust 128.

RETARDER APPLY MECHANISM

The retarder apply mechanism has a linkage with a manual retarder apply member or pedal 131 mounted for pivotal movement by a pivot 132 on a stationary support 133 on the transmission housing 23 or vehicle frame. A return spring 136 grounded or mounted on a portion of support 133 biases pedal 131 to the retarder off position engaging the retarder off stop 137 on the support. The pedal is moved to the retarder on position limited by the retarder on stop 138 on the support. The stops are preferably high durometer rubber stops. The pedal 131 is pivotally connected by pivot 141 to apply rod portion 142 and on pedal movement between retarder off and retarder on positions, moves apply rod portion 142 a distance to move the valve element the distance between the valve retarder off and on positions. These distances are equal in the direct rod control illustrated but may be proportional if the linkage provides proportional movement.

The rod portion 142 is rigidly connected by the attachment device 143 to the open end wall 144 of air cylinder or actuator motor 146. The end wall 144 is suitably secured by means, not shown, to the cylindrical portion 147 which has at the opposite end a closed end wall 148. A piston 149, having a suitable seal 150, is sealed and slidably mounted in cylindrical portion 147. A piston rod or apply rod portion 151 is slidably mounted and sealed in bore 152 in the end wall 148 and thus defines a pressure apply chamber 153 between the piston 149 and closed end wall 148 in the cylinder. The chamber 153 is open to actuator line 127 in all piston positions. A return spring 154 seated on open end wall 144 engages and biases piston 149 to automatic off or manual on off control position in movement limiting stop engagement with the closed end wall 148. The spring chamber portion of cylinder 147 is vented by exhaust 156 which is restricted to control the rate of automatic retarder apply movement. The piston rod 151 is pivotally connected by pin 157 to the stem 111 of valve element 73. The actuator line 127 is flexible since actuator motor 146 moves bodily with the rod assembly or linkage 139. When air pressure is supplied by flexible actuator line 127 to chamber 153, the piston 149 and piston rod 151 move relative to the cylinder 147 and cylinder rod or apply rod portion 142 to a retarder on position a distance limited by the valve and a stop pin 158 mounted on the piston 149 or end wall 144, equal to the valve element movement distance. The stop pin 158 has a high durometer rubber end portion to cushion and silence the stop operation.

OPERATION

During all phases of operation when the input housing 18 is being driven, the pump 41 provides main line pressure in main line 46 which is regulated at a high value, i.e., 165 psi, by the main regulator valve 49 and connected to the transmission control valves 51 for controlling the power shift transmission 16. Pump 41 also provides a second fluid pressure supply in the lubrication supply line 48 which is regulated at an intermediate pressure, i.e., 70 to 125 psi, by the lubrication regulator valve 54 which provides a low pressure differential, i.e., 20 psi. The lubrication supply line 48 is connected through restriction 57 to lubrication line 58 at a lower lubrication pressure, i.e., 20 to 40 psi. The main regulator valve overage and the lube regulator valve overage are connected to the converter inlet line 52 to supply fluid to the torque converter operating chamber in an intermediate pressure range, i.e., 60 psi, depending on the pressure in the cooler outlet port 97 which increases during retarder operation with increasing retarder inlet pressure from a minimum low pressure, i.e., 2 psi to a maximum low pressure, i.e., 55 psi.

With the retarder valve 71 in the retarder off position, the converter inlet supply in converter inlet 52 flows in series through the converter operating chamber, converter outlet line 53, converter outlet port 89 of the retarder valve, cooler inlet line 91 and cooler 92. Full converter flow volume flows out of the cooler in cooler outlet line 96 to cooler out port 97 and in parallel to the supplemental lubrication line 98 and relief line 63 which is maintained at a low pressure, i.e., 55 psi, and exhausts the flow to sump. In retarder off, the secondary converter pressure regulator valve regulates the converter operating chamber pressure by a value, i.e., 112 psi, due to the system pressure drop, largely the pressure drop in the cooler 92. When the cooler outlet pressure is above the lubrication pressure as in normal retarder off operation there is supplemental lubrication flow in line 98.

During retarder off operation, the retarder out line 87 is connected through ports 88 and 82 to the retarder dump exhaust 86. Flow to the retarder in line 94 is blocked and atmospheric vent 122 admits air to the retarder chambers 27, 28 so that low pressure in the chambers does not slow dumping of the retarder chambers by the pumping action to outlet passage 87.

When there is an abnormal downstream restriction in the converter and cooler circuit due, for example, to cold oil in the converter and cooler causing the pressure to rise in the converter inlet line 52 the pressure is limited at an intermediate value, 52 to 105 psi, as the cooler outlet pressure varies from minimum to maximum i.e., 2 to 55 psi. The primary converter regulator valve 62 provides a differential pressure of an intermediate value, i.e., 50 psi, to the primary regulator valve overage and relief line 63 which is relieved at 55 psi by connecting the flow to sump. The normal converter cooler system pressure drop is less than the differential pressure of the primary converter regulator valve 62 so it is normally closed in all retarder valve positions. The complete full diameter portion 107 of land c retarder valve element 103 closes the connection from cooler outlet port 97 to exhaust 103.

When the retarder valve 71 is moved a small initial distance from the retarder off position to the minimum retarder capacity position, the retarder outlet line 87 and its port 88 are disconnected from dump exhaust 86 and are connected to converter outlet port 89 to join the converter outlet flow in converter outlet line 53 to the cooler inlet line 91 and cooler 92. At the same time, retarder valve 71 positions the largest portion of recess 106 to connect cooler out port 97 to control exhaust port 102 to provide minimum restriction flow to exhaust and thus the minimum cooler outlet and retarder inlet pressure and flow. When these conditions are established, the cooler outlet port 97 is connected to the retarder inlet port 93 and 94. The pressure reduction due to the variable restriction exhaust recesses 106 and induction pumping at the retarder inlet 34 induces the retarder inlet pressure in the cooler outlet line 96 to a minimum low value, i.e., 2 psi to provide a larger pressure drop through the converter and cooler system increasing flow for rapid filling of the retarder chambers. Continued movement of the retarder control valve element 73 toward the retarder full on position moves the recesses 106 relative to the cooler outlet port 97 and control exhaust port 102 to reduce the passage therebetween and thus increase restriction so the supply pressure from the cooler out line 96 to the retarder inlet line 94 increases and accordingly increases filling speed and the power capacity of the retarder. During this partial retarder operating phase after the retarder operating chambers are partially filled, steady state partial retarding is established and the entire converter supply flow supplied via converter outlet line 53, the cooler and cooler outlet line 96 is exhausted through the recesses 106 to the control exhaust port 102 and line 103. When the restriction provided by the recesses 106 is reduced sufficiently or completely closed, by complete full diameter portion 104 of land c entering the bore, full capacity retarder operation is provided. Then the pressure in cooler outlet port 97 which is supplied to the retarder is limited at a maximum low value, i.e., 55 psi, by the secondary converter pressure regulator valve 64 to limit capacity.

During partial and full retarding, the pumping action, varying as a function of toroidal flow, provides quick filling and dumping for quick control response and the necessary pressure differential and flow to provide sufficient flow through the cooler increasing as a function of the power being absorbed and thus the heat that must be dissipated by the cooler.

Under normal operating engine speed conditions which occur when the engine is driving a load or vehicle, the engine speed governor 116 de-energizes solenoid 129 so the normally closed or spring closed valve 126 connects chamber 153 and actuator line 127 to exhaust 128. Then the spring 154, the normal biasing means, moves or biases piston 149 into stop or movement limiting engagement the closed end wall 148, the automatic off or retarder manual on off control position of the piston 149 relative to the cylinder 147, and thus of the actuator motor 146. Thus the apply mechanism linkage or rod assembly 139 including cylinder rod 142, actuator 145 and piston rod 152, is in an elongated condition. Then when the pedal 131 is biased by its return spring 136 to engage pedal off stop 137, the retarder off position, the valve element 73 will be positioned by the elongated rod assembly in the retarder off position under the bias of its return spring 76. The air cylinder spring 154 provides a large force so it acts without compression to transmit the return spring force without compression. When the pedal 131 is moved from retarder off position against the bias force of return spring 136 to the retarder full on position, engaging pedal on stop 138, the elongated linkage assembly 139 moves valve element 73 against the bias force of its return spring 76 to the full on position engaging valve retarder on stop 108. During this retarder apply movement, the apply force is positively mechanically transmitted from the pedal to the valve element since the spring 154 holds piston 149 in engagement with closed end wall 148 of the cylinder 147.

When the pedal 131 is manually permitted to be returned by its return spring 136 to the retarder off position engaging stop 137, the elongated rod assembly 139 transmits the return force through spring 154 to the piston 149 of actuator 146 to the valve element 73 to act with the valve element return spring 76 to return the valve element to the retarder off position.

When the engine or transmission input speed increases to a predetermined acceptable overspeed due to the load driving the engine, as occurs during downhill vehicle operation, the signal biasing means, the speed governor 116, and control valve 126 provide an overspeed biasing signal. The speed governor 116 provides an electric overspeed signal in conductor 121. The electric overspeed signal actuates control valve 126 to connect an air pressure biasing signal to chamber 153 to move or bias piston 149 from the normal automatic off position against the bias of return spring 154 or the normal biasing means through a distance equal to the valve element movement distance, to the retarder on position shown to shorten the linkage to move the valve element from the retarder off against the bias of its return spring 76 to the retarder full on position shown. The pedal 131 engages its off stop 137 to provide the reaction for the force provided by spring 154 to move the valve element 73 to the retarder on position. Valve element movement in the retarder full on position is limited by its movement limiting stop 108.

The air exhaust 156 is restricted to control the speed of movement of piston 149 and valve element 73 to a normal quick movement and to prevent excessive bumping or hammering on stop 108. The stop pin 158 with its high durometer rubber cushion is set to engage wall 144 just before full on position to snub movement of the piston and valve element engaging stop 108 which is the controlling stop limiting valve and piston movement.

On reduction of engine speed through the hysteresis speed range to a speed just below the rated or governed speed, the speed governor 116 discontinues the overspeed signal, providing a normal speed signal, de-energizing solenoid valve 126 to connect chamber 153 to exhaust 128 to permit spring 154 to return piston 149 to the normal position elongating actuator linkage or rod assembly 139 and thus returning valve element 73 to the retarder off position limited by stem 79 engaging plate 81, the retarder off stop.

On automatic return of the actuator 146 to the normal position, the linkage is conditioned for manual retarder operation.

The pedal return spring 136 provides sufficient force to provide normal reaction force or feel during apply and release for proper manual operation. The manual apply force is large to overcontrol the valve and pedal return springs and valve and linkage friction. The pedal return spring 136 provides sufficient return force which when added to the force of valve return spring 76, will overcome valve and linkage friction and provide an excess of force to quickly return the complete linkage and valve element during manual operation. Since the actuator spring transmits the portion of the pedal spring return force required to move the valve and the linkage between the valve less the valve spring force which may be almost as large as the pedal spring return force if the valve is not moving, the actuator spring provides a larger force than the pedal spring to insure a rigid linkage connection without lost motion during manual return operation.

For automatic apply operation the air pressure on the piston provides a sufficient excess of force to overcome the friction of the valve and the linkage between the piston and the valve return spring to shorten the linkage to move the valve to full on position. During automatic return operation the actuator spring elongates the linkage and the pedal spring as in manual return operation returns the valve to off position. Thus the actuator, pedal and valve springs are respectively high, intermediate and low force springs. During automatic retarder on operation the pedal is in off position and pedal apply is resisted by the pedal return spring, linkage friction and the actuator air pressure force to provide increased resistance to manual apply movement to provide a feel signal to the operator which may be overcome by the operator for manual apply to insure continuous retarding as speed decreases below the small underspeed. The automatic retarder overspeed control will thus overcontrol the manual control to fully apply the retarder with the pedal in retarder off position or any manually held partial retarding position.

The examples of regulated pressures given above assume, except for the converter cooler system, that the line pressure drop is not significant, the preferred construction, but it will be appreciated that they may be modified to accommodate for line pressure drop. It will also be appreciated that this preferred embodiment of the invention may be modified.

It is claimed:

1. In a hydrodynamic retarder; a drive member; hydrodynamic retarder means having a stator and a rotor operatively connected to said drive member in a retarder chamber operative on the supply of fluid to said chamber to retard said rotor; control valve means having a valve member movable between a retarder off position and a retarder full on position operative respectively to empty said retarder chamber and to fill said retarder chamber; speed governor means operatively connected to said drive member operative in response to a predetermined overspeed to provide an overspeed signal; control means having a manual actuator member movable between a manual retarder off position and a manual retarder on position and linkage means connecting said manual actuator member to said valve member and including motor means having a pair of relatively movable motor members movable between an automatic retarder off position and an automatic retarder on position and having normal biasing means to normally apply a force to position said motor members in one of said automatic retarder on position and said automatic retarder off position and signal biasing means connected to said governor means for operation in response to said overspeed signal to move said motor members to the other of said automatic retarder on position and said automatic retarder off position with a force and positive stop means to limit movement of said motor members in said automatic retarder off position, one motor member connected to said manual actuator member for conjoint movement of said one motor member and said manual actuator, the other motor member connected to said valve member for conjoint movement of said other motor member and said valve member, linkage biasing means biasing said manual actuator member to said manual retarder off position with less force than the force moving said motor means to said automatic retarder off position and actuator stop means to limit movement of said manual actuator member in said manual retarder off position and said control means operative when said motor means is biased by one of said normal and signal biasing means to said automatic retarder off position, in response to manual force moving said manual actuator member from said manual retarder off position to said manual retarder on position against said linkage biasing means to act through said linkage means with said motor means positive stop means engaged to positively manually move said valve member from said retarder off position to said retarder full on position and on relaxation of said manual force to permit said linkage biasing means to return said manual actuator member from said retarder full on position to said retarder off position under the force of said linkage biasing means transmitted by said linkage means through one of said normal and signal biasing means to move said valve member to retarder off position and operative when said motor means is moved by one of said normal and signal biasing means in response to said overspeed signal to said automatic retarder on position to move said valve member to said retarder full on position against the reaction of said manual actuator member in its manual retarder off position against said actuator stop means or other manually held position to provide the reaction for the motor means to move said valve member from retarder off to the full retarder on position.

2. In a hydrodynamic retarder; a drive member; hydrodynamic retarder means having a stator and a rotor operatively connected to said drive member in a retarder chamber with an inlet passage and an outlet passage operative on the supply of fluid to said inlet passage and chamber to retard said rotor; a source of fluid under pressure; control valve means having a valve member movable between a retarder off position and a retarder full on position and stop means to limit movement of the valve member beyond each position and being operative in said retarder off position to empty said retarder chamber and in said retarder full on position to connect said source to said retarder chamber to fill said retarder chamber; speed governor means operatively connected to said drive member operative in response to a predetermined overspeed to provide an overspeed pressure signal; control means having a manual actuator member movable between a manual retarder off position and a manual retarder on position and linkage means connecting said manual actuator member to said valve member and including motor means having a pair of relatively movable motor members movable between an automatic retarder off position and an automatic retarder on position and having motor biasing means to normally apply a force to position said motor members in said automatic retarder off position and connected to said governor means for operation in response to said overspeed pressure signal to move said motor members to said automatic on position and positive stop means to limit movement in said automatic retarder off position, a linkage means actuator portion connecting said manual actuator member to one motor member for conjoint movement of said manual actuator member and said one motor member and a linkage means valve portion connecting the other motor member to said valve member for conjoint movement of said other motor member and said valve member, linkage biasing means biasing said manual actuator member to said manual retarder off position with less force than said motor biasing means and actuator stop means to limit movement of said manual actuator member in said manual retarder off position and said control means operative, when said motor means is biased by said motor biasing means to said automatic retarder off position, in response to manual force moving said manual actuator member from said manual retarder off position to said manual retarder on position against said manual biasing means to act through said linkage means and said motor means and its positive stop means to positively manually move said valve member from said retarder off position to said retarder full on position and on relaxation of said manual force to permit said linkage biasing means to return said manual actuator member from said retarder full on position to said retarder off position under the force of said linkage biasing means transmitted by said linkage means and said motor means and said motor biasing means to move said valve member to retarder off position and operative when said motor means is moved by said overspeed pressure signal to said automatic retarder on position to move said valve member to said retarder full on position against the reaction of said manual actuator member in its manual retarder off position against said actuator stop means or any manually held partial retarding position to provide the reaction for the motor means to move said valve member from retarder off or any partial retarding position to the full retarder on position.

3. In a power train; a housing; an input member for drive by an engine and an output member for driving a load; a hydrodynamic retarder having a stator providing a bladed stator chamber and a bladed rotor drive connected to said output member for retarding and rotatably mounted in said stator chamber for hydrodynamic retarding when fluid is supplied to said stator chamber; retarder control valve means having a movable valve element and return bias means to bias the valve element for limited distance movement from a retarder full on position to a retarder off position connected to respectively fill and empty said chamber; governor means operatively connected to one of said members operative to provide a pressure signal in response to a predetermined overspeed; retarder apply means having an actuator member mounted for limited movement between a retarder off position and a retarder full on position, a return spring biasing said actuator member to the retarder off position; fluid motor means having a pair of relatively movable walls forming a chamber therebetween, one wall being connected to said actuator member for conjoint movement with said actuator member, the other wall being mounted for limited relative movement with respect to said one wall through a distance between a retarder automatic on position and a retarder automatic off position and operatively connected to said valve element for conjoint movement with said valve element from retarder on position to retarder off position, a return and force transmitting spring biasing said walls to the retarder automatic off position and a motor chamber between said walls selectively pressurized to move one wall against said return and force transmitting spring to said retarder automatic on position relative to the other wall, said governor means operative in the absence of said governor signal to connect said motor chamber to exhaust to permit said return and force transmitting spring to position said motor means in said retarder automatic off position and said actuator member in the retarder on and off positions acting through said motor means to respectively position said retarder control valve means in retarder on and off positions and motor means having restricted opening means and being operative in response to said signal to move said motor means at a slow rate controlled by said restricted opening means to the retarder automatic on position to move said retarder control valve means at a controlled rate to said retarder full on position to automatically apply said retarder in response to overspeed.

4. In a power train; a housing; an input for drive by an engine and an output member for driving a load; hydrodynamic retarder means having a retarder chamber with a bladed stator and a bladed rotor drive connected to said output member for retarding and having an inlet passage and an outlet passage for hydrodynamic retarding when fluid is supplied to said retarder chamber; a source of fluid under pressure; retarder control valve means having a movable valve element and return bias means to bias the valve element for limited distance movement from a retarder full on position to a retarder off position and connected to said source, chamber inlet and outlet passages operative with said valve element in said retarder off position to connect said chamber outlet passage to exhaust and to block said chamber inlet passage and operative on movement of said valve element to retarder full on position to connect said source to said chamber inlet passage for full retarding; governor means operatively connected to one of said members operative to provide a pressure overspeed signal in response to a predetermined overspeed; retarder apply means having a manual actuator member movable between a retarder off position and a retarder full on position, a return spring biasing said apply means to the retarder off position, first stop means limiting actuator member movement in the retarder off position, fluid motor means having a cylinder having an end closing wall at one end and an open wall at the other end and said cylinder operatively connected to said actuator member for bodily movement by said actuator member and conjoint movement of said cylinder and said actuator member, a piston in said cylinder mounted for movement relative to said cylinder between a retarder automatic on position and a normal retarder automatic off position and operatively connected to said valve element for conjoint movement of said piston and said valve element, a return and force transmitting spring seated on said cylinder biasing said piston to the normal retarder automatic off position, second stop means limiting piston movement in said normal retarder automatic off position and a cylinder chamber between said piston and closing wall connected to said governor means and operative in response to said pressure signal to more said piston against said return and force transmitting spring to said retarder automatic on position relative to said cylinder operative in the absence of said governor pressure signal to permit said return and force transmitting spring to position said piston in said retarder automatic off position relative to said cylinder and said retarder apply means in the retarder on and off positions acting to transmit force through and bodily move said fluid motor means, in the apply direction through said second stop means and in the release direction through said return and force transmitting spring, to respectively position said retarder control valve means in retarder on and off positions and operative in response to said pressure signal to move said piston against said return and force transmiting spring relative to said cylinder to the retarder automatic on position to move said retarder control valve means to said retarder full on position to automatically apply said retarder in response to overspeed against the reaction of said manually actuated member against said first stop means in retarder off position or any manually held position.

5. In a power train; a housing; an input member for drive by an engine and an output member for driving a load; hydrodynamic retarder means having a bladed stator fixed on said housing and a bladed rotor rotatably mounted drive connected to said members for retarding and to form a retarder chamber having an inlet passage and an outlet passage for hydrodynamic retarding when fluid is supplied to said retarder chamber inlet passage and operative to pump fluid to said outlet passage; a cooler having an inlet passage and an outlet passage; a source of fluid under pressure connected to said cooler inlet passage; an exhaust; retarder control valve means having a movable valve element providing a variable restriction, return bias means to bias the valve element with a low force and valve stop means for limited distance movement from a retarder full on position to a retarder off position and connected to said retarder chamber inlet and outlet passages, said cooler inlet and outlet passages and said exhaust operative with said valve element in said retarder off position to connect said chamber outlet passage to exhaust to block said chamber inlet passage and to open said variable restriction and connect said cooler outlet through said open variable restriction to exhaust and operative on movement of said valve element to retarder full on position to connect said chamber outlet passage to said cooler inlet passage and said cooler outlet passage to said chamber inlet passage and progressively close said variable restriction for increasing flow to said chamber for increase to full retarding; governor means operatively connected to said input member operative to provide an overspeed signal in response to a predetermined input member speed at a predetermined engine overspeed above the governed speed and having hysteresis to maintain said overspeed signal down to a speed just below said governed speed; a source of air under pressure; retarder apply linkage means having a manual actuator member mounted for movement, actuator member stop means limiting movement to the same limited distance movement as said valve element between a retarder off position and a retarder full on position, a return spring biasing said linkage means with an intermediate force to the retarder off position; air cylinder motor means having a cylinder having an end closing wall at one end and an open spring seat wall with a restricted opening at the other end and connected to said actuator member for movement with said actuator member, a piston in said cylinder mounted for movement relative to said cylinder, piston cylinder stop means limiting movement to the same limited distance as said valve element between a retarder automatic on position and a normal retarder automatic off position and having a piston rod extending through said closing wall in slidable sealed relation and connected to said valve element, a return and force transmitting motor spring seated on said open spring seat wall and biasing said piston with a high force to the normal retarder automatic off position to shorten said linkage means and a cylinder chamber between said piston and closing wall selectively pressurized to move said piston against said return and force transmitting spring to said retarder automatic on position relative to said cylinder to elongate said linkage means and an air valve means having an exhaust and connected to said cylinder chamber, said air source and said governor means and operative in the absence of said governor overspeed signal to connect said cylinder chamber to exhaust to permit said return and force transmitting spring to position in said retarder automatic off position relative to said cylinder and said retarder apply linkage means in the retarder on and off positions acting through said air cylinder means, the positive stop means transmitting manual apply force and the high force motor spring transmitting the intermediate force from the return spring to respectively manually position said retarder control valve means in retarder on and off positions and operative in response to said overspeed signal to connect said air source to said cylinder chamber to move said piston against said return and force transmitting spring at a slow rate controlled by said restricted opening relative to said cylinder to the retarder automatic full on position to move said retarder control valve means at a controlled rate to said retarder full on position to automatically fully apply said retarder in response to overspeed with said apply member in the retarder off position or any manual held position providing the reaction.

6. The invention defined in claim 5 and a vehicle air brake system supplied by said source of air under pressure.

* * * * *